(12) United States Patent
Degler et al.

(10) Patent No.: US 8,020,680 B2
(45) Date of Patent: Sep. 20, 2011

(54) HYDRODYNAMIC TORQUE CONVERTER DEVICE FOR AN AUTOMOTIVE DRIVE TRAIN

(75) Inventors: Mario Degler, Baden-Baden (DE); Stephan Maienschein, Baden-Baden (DE); Jan Loxtermann, Baden-Baden (DE); Thorsten Krause, Buehl (DE)

(73) Assignee: LuK Vermoegensverwaltungsgesellschaft mbH, Buehl (DE)

( * ) Notice: Subject to any disclaimer, the term of this patent is extended or adjusted under 35 U.S.C. 154(b) by 573 days.

(21) Appl. No.: 12/084,840

(22) PCT Filed: Oct. 16, 2006

(86) PCT No.: PCT/DE2006/001820
§ 371 (c)(1),
(2), (4) Date: May 9, 2008

(87) PCT Pub. No.: WO2007/054053
PCT Pub. Date: May 18, 2007

(65) Prior Publication Data
US 2009/0120754 A1   May 14, 2009

(30) Foreign Application Priority Data

Nov. 10, 2005   (DE) .......................... 10 2005 053 611

(51) Int. Cl.
*F16H 45/02* (2006.01)
(52) U.S. Cl. ..................................... 192/3.29; 192/213.2
(58) Field of Classification Search ........................ None
See application file for complete search history.

(56) References Cited

U.S. PATENT DOCUMENTS 5,713,442 A * 2/1998 Murata et al. ................ 192/3.29
2004/0226794 A1* 11/2004 Sasse et al. .................. 192/3.29

FOREIGN PATENT DOCUMENTS

| DE | 19514411 A1 | 11/1995 |
| DE | 19920542 A1 | 11/1999 |
| DE | 10358901 A1 | 2/2005 |

* cited by examiner

*Primary Examiner* — David D Le
*Assistant Examiner* — Jacob S Scott
(74) *Attorney, Agent, or Firm* — Simpson & Simpson, PLLC (57) ABSTRACT

A hydrodynamic torque converter device for an automotive drive train, comprising a torsional vibration damper and a converter torus which is formed by an impeller, a turbine wheel and a stator. The torsional vibration damper has a first energy accumulating device with one or more first energy accumulators, and a second energy accumulating device with one or more second energy accumulators, which is connected in series to the first energy accumulating device.

10 Claims, 4 Drawing Sheets

Fig. 4

HYDRODYNAMIC TORQUE CONVERTER DEVICE FOR AN AUTOMOTIVE DRIVE TRAIN

CROSS-REFERENCE TO RELATED APPLICATIONS

This application is the National Stage of PCT International Application No. PCT/DE2006/001820, filed Oct. 16, 2006, which application published in German and is hereby incorporated by reference in its entirety, which application claims priority from German Patent Application No. DE 10 2005 053 611.5, filed Nov. 10, 2005 which is incorporated by reference in its entirety.

FIELD OF THE INVENTION

The invention relates to a hydrodynamic torque converter device for an automotive drive train, comprising a torsion vibration damper and a converter torus which is formed by a pump shell, a turbine shell and a stator shell.

BACKGROUND OF THE INVENTION

FIG. 3 of German Patent No. DE 196 14 411 A1 shows a hydrodynamic torque converter device for a motor vehicle drive train, which comprises a torsion vibration damper and a converter torus, which is formed by a pump shell, a turbine shell, and a stator shell. The torsion vibration damper included therein comprises exactly one energy accumulator means, which is disposed between an input component and an output component. The output component is non-rotatably connected to a hub, which in turn is non-rotatably connected to a shaft. The input component is connected to the piston of a torque converter lockup clutch, so that the energy accumulator means can be loaded by the converter housing through the input component when the converter lockup clutch is closed. The input component is furthermore coupled to the outer turbine shell of the converter torus by a rivet joint. This is provided so that the outer turbine shell comprises an outward facing embossing in the portion where it defines the torus interior or the torus cavity, wherein a rivet is disposed in the embossing, which creates a non-rotatable connection to the input component of the outer turbine dish through respective openings of the outer turbine dish and of the input component.

FIG. 1 of German Patent No. DE 199 20 542 A1 shows a hydrodynamic torque converter device for a motor vehicle drive train, in which the torsion vibration damper comprises two energy accumulator means. Therein, a driver component is welded to the outside of the outer turbine dish in the portion, which defines the interior of the torus, wherein the driver component is connected to the input component of an outer damper or of an outer energy accumulator means by a push-in connection. The output component of the outer energy accumulator means is coupled again to the piston of a converter lockup clutch and simultaneously forms the input component of the inner energy accumulator means, whose output component is connected to a hub.

Another hydrodynamic torque converter device for a motor vehicle drive train, in which the torsion vibration damper comprises two energy accumulator means is shown in FIG. 1 of German Patent No. DE 103 58 901 A1. In this configuration the input component of the outer energy accumulator means is coupled with a converter lockup clutch. An intermediary component simultaneously forms the output component of the outer energy accumulator means and the input component of the inner energy accumulator means, which is connected to a hub through its output component. At this hub, a protrusion of the outer turbine dish is supported in radial direction. At the outside of the outer turbine dish, a driver component is welded on in the portion, in which the outer turbine dish defines the torus interior, wherein the driver component is on the other hand coupled to the intermediary component by means of a connection means configured as a bolt connection.

BRIEF SUMMARY OF THE INVENTION

The present invention is a hydrodynamic torque converter device for a motor vehicle drive train, which comprises a torsion vibration damper and a converter torus, formed by a pump shell, a turbine shell, and a stator shell. It is appreciated with this regard, that a means designated as "converter torus" in this publication is sometimes designated as "hydrodynamic torque converter" in previous publications. The term "hydrodynamic torque converter" is, however, also used for devices in previous publications, which comprise a torsion vibration damper, possibly a converter lockup clutch and a means formed by a pump shell, a turbine shell, and a stator shell, or according to the present disclosure, comprise a converter torus. In consideration of this background, the terms "hydrodynamic torque converter device" and "converter torus" are used for purposes of clarity.

The torsion vibration damper comprises a first energy accumulator means, comprising one or several first energy accumulators, and a second energy accumulator means comprising one or several second energy accumulators. The first energy accumulator means is connected in series to the second energy accumulator means, wherein between the two energy accumulator means a first component is provided, which is also connected in series. The converter torus in its typical shape comprises a torus interior, or a torus cavity, which is provided substantially torus-shaped or annular. An outer turbine shell forms a wall section, directly abutting to the interior of the torus in order to define the torus.

The outer turbine dish is connected to the first component, so that a load, like a torque or a force, can be transferred from the outer turbine dish to the first component, wherein at least one connection means is provided along the load transfer path, formed therewith, through which the load or the torque can be transferred from the outer turbine dish to the first component, by which connection means in particular abutting components for torque or load transfer are connected amongst each other. Such a connection means can, e.g., be a rivet joint, a bolt joint, a threaded joint, a weld, a plug-in connection, or the like.

It is provided that all connection means, by which in particular abutting components are connected along a load transfer path between the outer turbine shell and the first component, are offset from the wall section of the outer turbine shell directly abutting to the torus interior or the torus cavity, defining the torus cavity. It can be provided, in particular, that turbine blades are provided, which are arranged in the interior of the torus, or in the torus cavity in a known manner. The connection means are advantageously disposed offset from the sections of the outer turbine dish, where the turbine blades abut to the outer turbine dish, or where they are integrally formed.

It is provided that the power transfer path between the outer turbine shell and the first component is free from the first and the second energy accumulator means, so that a torque or a load can be transferred along this load transfer path from the outer turbine dish to the first component, without being transmitted by or through one of the energy accumulator means, before the torque or the load reaches the first component.

It can be provided that along the load transfer path exactly one connection means is provided for connecting abutting components of the load transfer path. This can be performed so that the outer turbine shell, which is configured in particular in one piece, comprises an extension, which adjoins to the wall section, which is provided for defining the interior of the torus, wherein the protrusion extends to the second component and is connected therewith in the location. However, it can also be provided that exactly two connection means are provided in the load transfer path. This can be provided so that an extension of the outer turbine dish is provided, which adjoins to the wall section of the turbine dish, which is provided for defining the torus interior, wherein the extension is integrally connected to the wall section, or made in one piece, and connected to a driver component like a plate or similar by a first connection means. The driver component can thus be connected to the second component by a second connection means. More than two connection means can also be provided in the load transfer path.

It can be provided that the first energy accumulator means comprises several first energy accumulator means, which are circumferentially distributed and disposed at a distance relative to one another with reference to the circumferential direction of a rotation axis, about which the torsion vibration damper is advantageously rotatable, and/or that the second energy accumulator means comprises several circumferentially distributed or offset second energy accumulators. Thus, the energy accumulators do not have to be disposed on an exactly circumferential path. It can be provided that the first energy accumulators of the first energy accumulator means are respective arc springs, and the second energy accumulators of the second energy accumulator means are respective straight springs or straight compression springs. In an advantageous manner, the first energy accumulators of the first energy accumulator means and also the second energy accumulators of the second energy accumulator means are respective spiral springs.

In a preferred embodiment, the torque converter device furthermore comprises a converter lockup clutch. It can be provided that the converter lockup clutch is connected to a converter housing on the input side and connected on the output side directly or through one or several interconnected components to a second component, so that a torque can be transferred from the converter housing through the converter lockup clutch to the second component, when the converter lockup clutch is closed. The second component can be the input component of the first energy accumulator means. In another preferred embodiment, it is provided that the second energy accumulator means is disposed connected in series between the first component and the third component. The third component can form a hub or can be non-rotatably connected with a hub. Such a hub can be non-rotatably coupled with a shaft, like a transmission input shaft or similar. It is thus preferred, in particular, that in the following sequence: a second component, the first energy accumulator means, a first component, the second energy accumulator means, and a third component, are connected in series. It can be provided that the series connection is exclusively comprised of the components, or that one or several parallel or interconnected components are provided.

According to a particularly advantageous embodiment, it is provided that the outer turbine dish is disposed pivotable or rotatable relative to the hub. In particular, in such an embodiment it can be provided that the outer turbine dish is preferably supported by a sleeve-shaped support section in radial direction at the hub. The support can thus be performed, so that substantially no torque is transferred from the outer turbine dish to the hub. Thus, it is provided in particular that a torque can be transferred from the outer turbine shell to the hub substantially through the second energy accumulator means, not, however, through an additionally provided radial support from the outer turbine dish to the hub. It can be provided that an additional support means, like a straight bearing bushing or a roller bearing or similar, is provided between the support section and the hub.

The in particular sleeve-shaped support section can be provided at an extension of the outer turbine dish, or at a driver component or at a separate support component. As discussed, it is provided in a particularly preferred embodiment that the outer turbine dish or a protrusion of the outer turbine dish is connected to the second component by means of a driver component. Thus, it can be provided that the protrusion is connected to the driver component by a first connection means and the driver component is connected to the first component by a second connection means. It can thus also be provided in particular that the driver component comprises an extension, at which the energy accumulator(s) of the first energy accumulator means is (are) supported.

In a preferred embodiment, the driver component extends from a section disposed in the radially inner portion of the outer turbine dish, or in an extension of the outer turbine dish to the second component. However, it can also be provided that the driver component extends from a radially outer section of the outer turbine dish to the second component.

In a particularly preferred embodiment, it is provided that the driver component and/or the first component and/or the second component and/or the third component are configured as plates. In particular, in a configuration in which the second component and the driver component are respectively configured as plates, it is advantageously provided that the driver component or the driver plate has greater wall thickness, than the second component. According to a particularly preferred improvement, it is provided that the driver component, in particular with reference to the rotation axis of the torsion vibration damper, comprises a larger mass moment of inertia than the second component. It can also be provided that the mass of the driver component is greater than the mass of the second component.

It can further be provided that a relative rotation angle limiter or a rotation angle limiter is provided for the torsion vibration damper or for the first and/or the second energy accumulator means, and thus a rotation angle limiter, which goes into an end stop position, before the energy accumulators of the first or second energy accumulator means go into blockage, if they are provided, so that they can go into blockage. Such a rotation angle limiter limits the maximum relative rotation angle between the input component and the output component of the respective energy accumulator means. In an advantageous embodiment, the rotation angle limiter is only provided for the second energy accumulator means, not for the first energy accumulator means. Thus, it can be provided that the first energy accumulators are arc springs and the second energy accumulators are straight (compression) springs.

It is provided in a particularly preferred embodiment that the driver component is connected or non-rotatably connected to the outer turbine dish or to an extension of the outer turbine dish through first connection means, wherein the connection means are provided in a portion, in which the protrusion or the outer turbine dish and/or the driver component are provided straight, and where it respectively extends in particular straight in radial direction in a particularly preferred embodiment with reference to the radial direction of the rotation axis of the torsion vibration damper.

It is the object of the invention to provide a torque converter device for a motor vehicle drive train, comprising a torsion vibration damper and a converter torus, formed by a pump shell, a turbine shell, and a stator shell, wherein the torque converter device is easy to manufacture and facilitates the safe reduction and compensation of torque spikes of a combustion engine.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIGS. 1-4 show different embodiments of hydrodynamic torque converter device 1 of the present invention. Hydrodynamic torque converter device 1 is provided for a drive train of a motor vehicle, or forms a component of a motor vehicle drive train, which is indicated schematically by the reference numeral 2. Hydrodynamic torque converter device 1 comprises torsion vibration damper 10, converter torus 12, formed by pump shell 20, turbine shell 24, and stator shell 22, and further comprises converter lockup clutch 14.

Torsion vibration damper 10, converter torus 12, and converter lockup clutch 14 are received in converter housing 16. Converter housing 16 is connected substantially non-rotatably to drive shaft 18, which is, e.g., the crankshaft or engine output shaft of a combustion engine.

Converter torus 12 comprises a pump or pump shell 20, stator shell 22, and turbine or turbine shell 24, which interact in a known manner. In a known manner, converter torus 12 comprises converter torus interior or torus interior 28, which is provided for receiving oil, or for oil through flow. Turbine shell 24 comprises outer turbine dish 26, which forms wall section 30, directly abutting to torus interior 28, and provided for defining torus interior 28. Extension 32 of outer turbine dish 26 adjoins to wall section 30, directly abutting to torus interior 28. Extension 32 comprises straight or annular section 34. Straight or annular section 34 of extension 32 can, e.g., be provided so that it is substantially straight in radial direction of rotation axis 36 of torsion vibration damper 10, and, in particular, as an annular section, it is located in a plane perpendicular to rotation axis 36, or it establishes the plane.

Torsion vibration damper 10 comprises first energy accumulator means 38 and second energy accumulator means 40. First energy accumulator means 38 and/or second energy accumulator means 40 are, in particular, spring means.

In the embodiments shown in FIGS. 1-4, it is provided that first energy accumulator means 38 comprises a plurality of first energy accumulators 42 like, e.g., coil springs or arc springs, in a circumferential direction extending about rotation axis 36, which are disposed in particular at a distance from one another. It can be provided that all first energy accumulators 42 are configured identical. It can also be provided that first energy accumulators 42 are provided which are configured differently.

Second energy accumulator means 40 comprises several second energy accumulators 44, configured, e.g., respectively as coil springs or straight (compression) springs. Thus, in a preferred embodiment, several second energy accumulators 44 are disposed at a distance to one another with reference to the circumferential direction of rotation axis 36. It can be provided that second energy accumulators 44 are respectively configured identical. Different second energy accumulators 44, however, can also be configured differently.

In the embodiments shown in FIGS. 1-4, second energy accumulator means 40 is disposed radially within first energy accumulator means 38 with reference to the radial direction of rotation axis 36. First energy accumulator means 38 and second energy accumulator means 40 are connected in series. Torsion vibration damper 10 comprises first component 46, which is disposed between first energy accumulator means 38 and second energy accumulator means 40, or connected in series with energy accumulator means 38 and 40. It is thus provided in particular that, e.g., with converter lockup clutch 14 closed, a torque is transferred from first energy accumulator means 38 through first component 46 to second energy accumulator means 40. First component 46 can also be designated as intermediary component 46.

In the embodiments shown in FIGS. 1-4, it is provided that outer turbine dish 26 is connected to intermediary component 46 so that a load, in particular, torque and/or force, can be transferred from outer turbine dish 26 to intermediary component 46.

Between outer turbine dish 26 and intermediary component 46, or in the load flow, in particular, torque or force flow between outer turbine dish 26 and intermediary component 46, driver component 50 is provided. It can also be provided that extension 32 forms intermediary component 46 and/or forms driver component 50, or takes over their function. It can also be provided that driver component 50 forms a first component or an intermediary component, which is connected in the torque flow between energy accumulator means 38 and 40, in series.

It is furthermore provided that along load transfer path 48, through which a load or a torque can be transferred from outer turbine dish 26 to intermediary component 46, at least one connection means 52, 56 or 54, 58 is provided. Such connection means 52, 56 or 54, 58 can be, e.g., a plug-in connection, as illustrated by reference number 58 in FIG. 4, or a rivet joint, or a bolt joint, as illustrated by reference number 56 in FIGS. 1-3 and reference number 54 in FIG. 4, or a weld, as illustrated by reference number 52 in FIGS. 1-3, or by other comparable means. It is appreciated that at the location where weld 52 is installed, as shown in FIG. 3, an additional rivet or bolt connection 54 is drawn in order to illustrate an alternative embodiment. This is also meant to illustrate that the connection means can also be configured differently, or that they can be combined differently. The respectively adjoining components of the load transfer path through which the load can be transferred from outer turbine dish 26 to intermediary component 46 are coupled among one another by the respective connection means 52, 54, 56, and/or 58. Thus, in the embodiments shown in FIGS. 1-3, extension 32 of outer turbine dish 26 is respectively non-rotatably coupled to driver component 50 by connection means 52, which is configured as a welded connection and which can, alternatively, be a rivet or a bolt connection, as shown in FIG. 3, and driver component 50 is non-rotatably connected to intermediary component 46 by respective connection means 56, which is configured as a rivet connection or as a bolt connection. In the embodiment shown in FIG. 4, extension 32 of outer turbine dish 26 is non-rotatably coupled to driver component 50 respectively by connection means 54, which is configured as rivet or bolt connection, and driver component 50 is non-rotatably coupled to intermediary component 46 respectively by connection means 58, configured as a plug-in connection.

It is provided that all connection means 52, 54, 56, and 58, by which components adjoining, for example, extension 32 and driver component 50, or driver component 50 and intermediary component 46, along load transfer path 48 between outer turbine dish 26 and intermediary component 46, are connected and offset from wall section 30 of outer turbine dish 26, which directly adjoins torus interior 28. This facilitates, at least according to the embodiments, the increase of the band width of the various connection means. Thus, it is possible, e.g., to not only use thin sheet metal welding or MAG- or laser- or dot welding, but also friction welding, which is not possible in a simple manner, e.g., in a configuration shown in FIG. 3 of German Patent No. DE 196 14 411 A1. Also, the use of bolt- or rivet joints as connection means can be realized more simply in the embodiments shown in FIGS. 1-4, than in embodiments of the type shown in FIG. 3 of DE 196 14 411 A1, so that a broader array of suitable connection means is available for selection. In addition, the risk of manufacturing-related, or thermally-related warping in the portion of the turbine blades, which are provided in torus interior 28 in the embodiments shown in FIGS. 1-4 is further reduced compared to the embodiment shown in FIG. 3 of DE 196 14 411 A1.

Second component 60 and third component 62 are connected in series with first energy accumulator means 38, second energy accumulator means 40, and intermediary component 46, provided between these two energy accumulator means 38 and 40. Second component 60 forms an input component of first energy accumulator means 38, and third component 62 forms an output component of second energy accumulator means 40. A load or a torque transferred by second component 60 into first energy accumulator means 38 can thus be transferred on the output side of first energy storage means 38 through intermediary component 46 and second energy accumulator means 40 to third component 62.

Third component 62 engages hub 64 forming a non-rotatable connection, wherein hub 62, in turn, is non-rotatably coupled to output shaft 66 of torque converter device 1, which is, e.g., a transmission input shaft of a motor vehicle transmission. Outer turbine shell 26 is radially supported at hub 64 by means of support section 68. Support section 68, which is, in particular, radially supported at hub 64, is configured substantially sleeve-shaped.

It is appreciated that the radial support of outer turbine dish 26 by means of support section 68 is performed, so that support forces acting through it upon outer turbine dish 26 are not transferred through first or second energy accumulator means 38 and 40, respectively, from support section 68 to outer turbine dish 26. Support section 68 is rotatable relative to hub 64. It can be provided that, between hub 64 and support section 68, a straight bearing, a straight bearing bushing, a roller bearing, or a comparable component is provided for radial support. Furthermore, respective bearings can be provided for an axial support. The connection already addressed above between outer turbine dish 26 and intermediary component 46 is configured, so that a torque transferred from outer turbine dish 26 to intermediary component 46 can be transferred from outer turbine dish 26 to intermediary component 46 without having one of energy accumulator means 38 and/or 40 provided along the respective load transfer path 48. The torque transfer from outer turbine dish 26 to intermediary component 46 through load transfer path 48 can also be performed by a substantially rigid connection.

In the embodiments shown in FIG. 1-4, two respective connection means are provided along the load- or force- or torque transfer path 48 between outer turbine dish 26 and intermediary component 46, and thus first connection means 52 or 54 and second connection means 56 or 58. It is appreciated that, with reference to the circumferential direction of rotation axis 36, several first connection means 52 or second connection means 56 can be disposed, or are preferably disposed distributed in circumferential direction. In the context of this disclosure, however, "first connection means" or "second connection means" is referred to, which literally means one or several first connection means or one or several second connection means. First connection means 52 or 54 non-rotatably connects extension 32 with driver component 50, and second connection means 56 or 58 non-rotatably connects driver component 50 with intermediary component 46. In these embodiments, it is provided that first connection means 52 or 54, with reference to the radial direction of axis 36, is disposed radially within second connection means 56 or 58. It is furthermore provided in these embodiments that first connection means 52 or 54 is disposed radially within second energy accumulator means 40, or radially within second energy accumulators 44 of second energy accumulator means 40. Second connection means 56 or 58 is disposed relative to the radial direction of axis 36 radially between first energy accumulator means 38 and second energy accumulator means 40, or first energy accumulators 42 of first energy accumulator means 38 and second energy accumulators 44 of second energy accumulator means 40.

Figure 1:
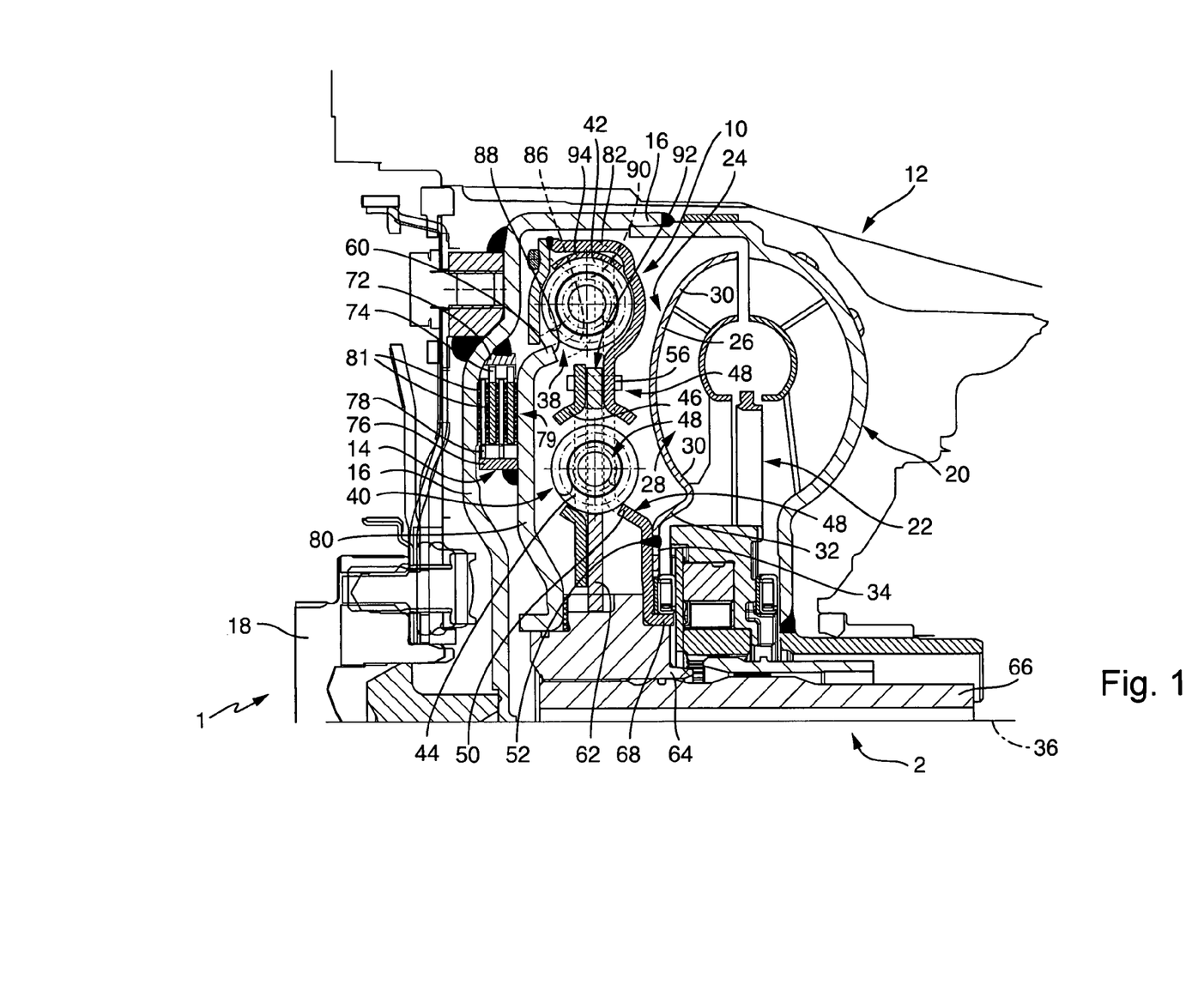
FIG. 1 shows a first embodiment of the present invention hydrodynamic torque converter device.
Figure 2:
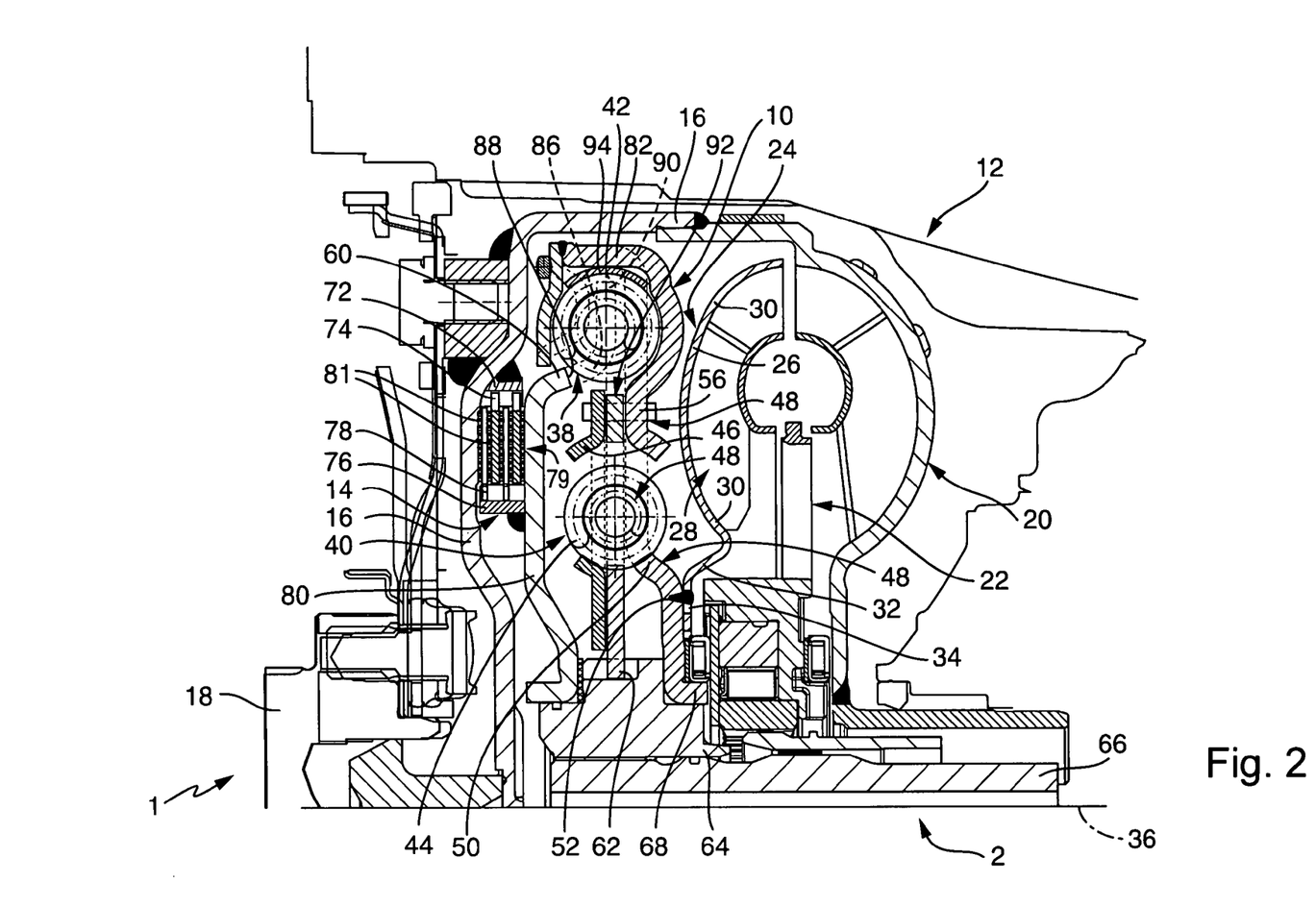
FIG. 2 shows a second embodiment of the hydrodynamic torque converter device.
Figure 3:
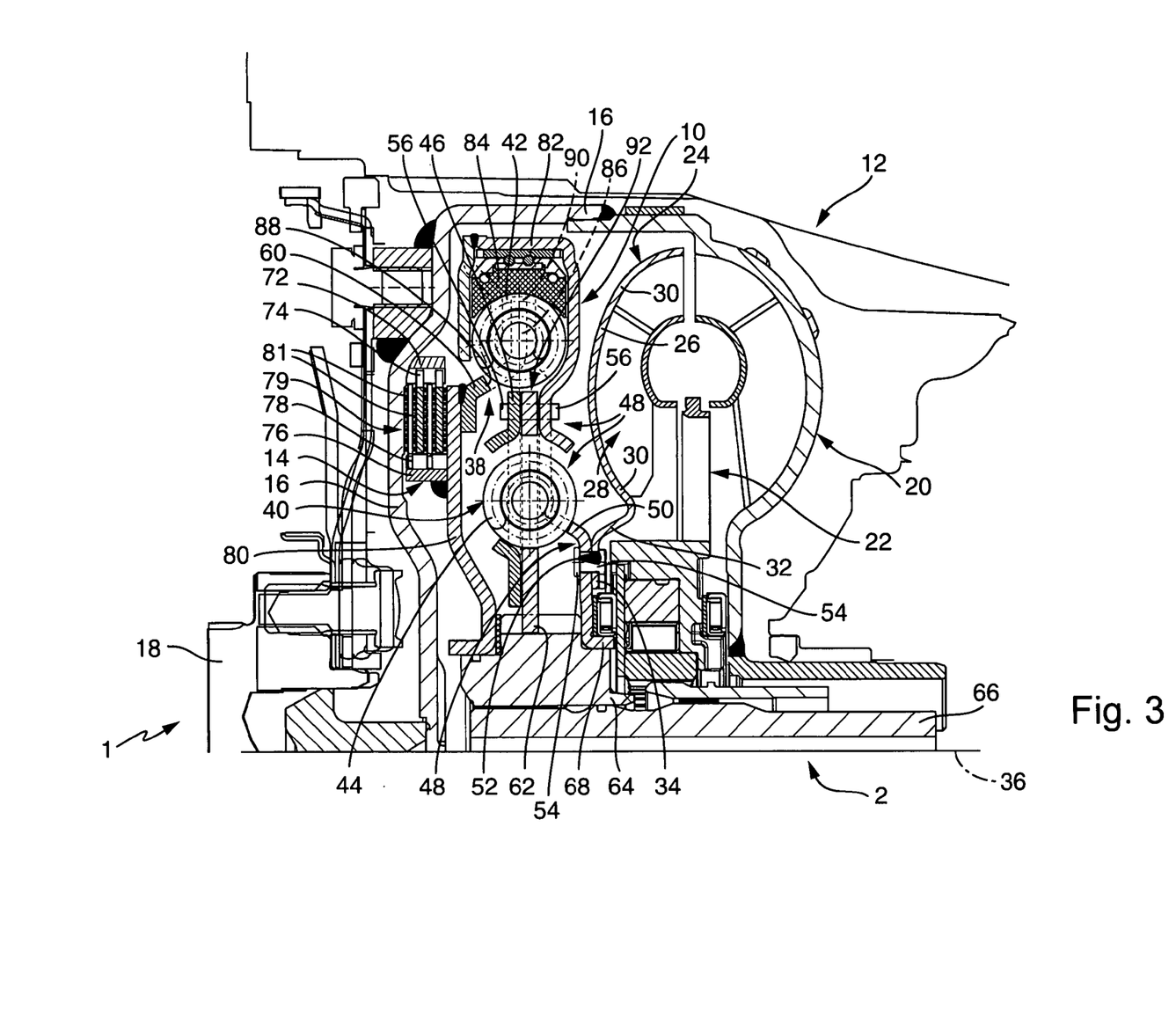
FIG. 3 shows a third embodiment of the hydrodynamic torque converter device; and, FIG. 4 shows a fourth embodiment of the hydrodynamic torque converter device.
Figure 4:
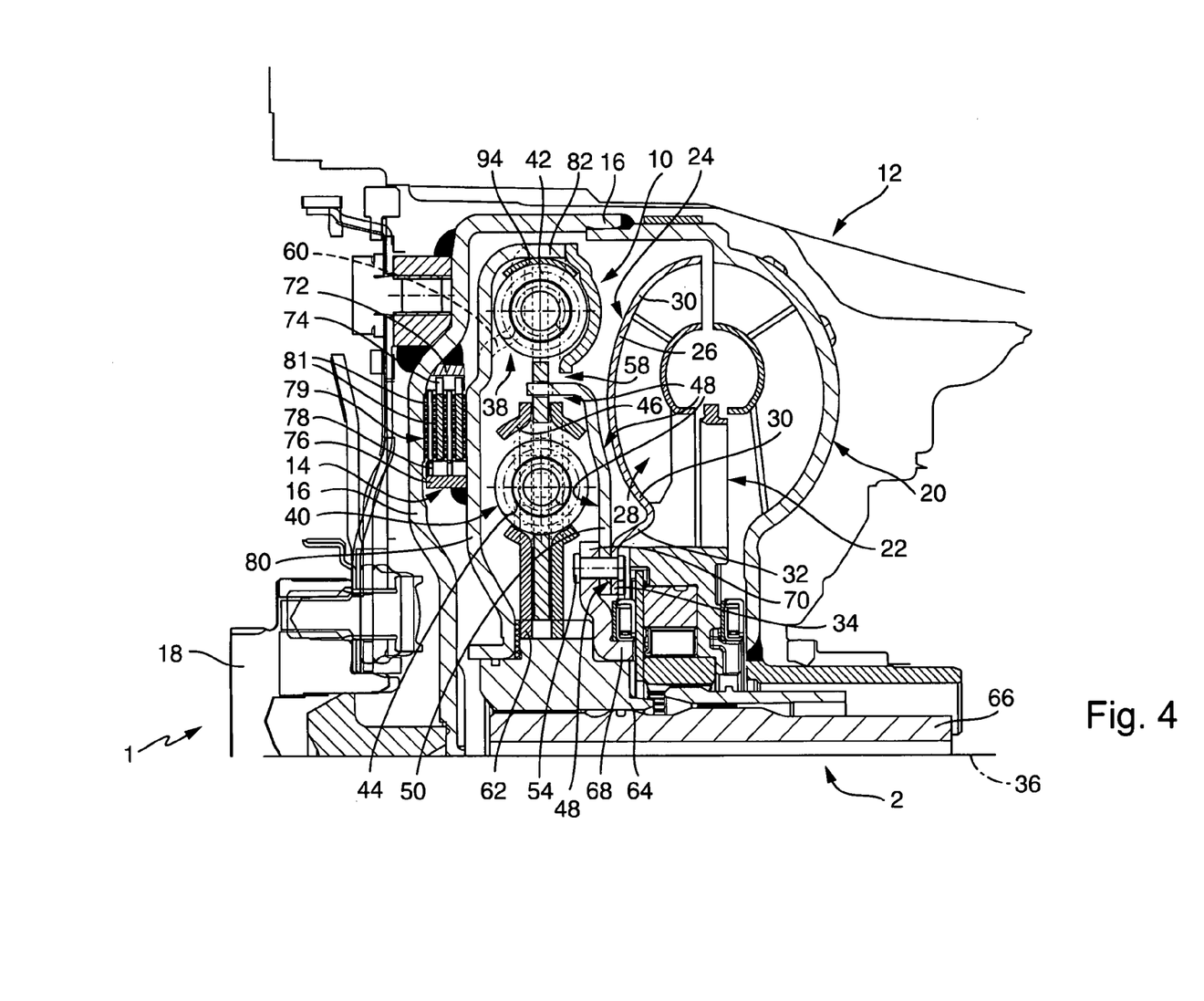

While in the embodiments shown in FIGS. 1-3, sleeve-shaped support portion 68 is a radially inward section, relative to the radial direction of rotation axis 36 of driver component 50, separate support component 70 is provided in the embodiment shown in FIG. 4, at which, at least with reference to the radial direction of rotation axis 36, sleeve-shaped support portion 68 is formed on the radial inside. Support portion 70 is non-rotatably connected to extension 32 and driver component 50. The non-rotatable connection is performed here also by connection means 54, wherein it is appreciated that separate connection means can also be provided.

Converter lockup clutch 14 is configured as a multi-disk clutch in the embodiments shown in FIGS. 1-4, respectively, and comprises first disk carrier 72, by which first disks 74 are non-rotatably received, and second disk carrier 76, by which second disks 78 are non-rotatably received. When multi-disk clutch 14 is open, first disk carrier 72 is movable relative to second disk carrier 76, so that first disk carrier 72 is rotatable relative to second disk carrier 76. Second disk carrier 76 is disposed herein, with reference to the radial direction of axis 36, radially within first disk carrier 72, however, the opposite can also be the case.

First disk carrier 72 is connected to converter housing 16 in a rigid manner. Disk clutch 14 comprises piston 80 for actuation, which is disposed axially movable and which can, e.g., be hydraulically loaded for actuating disk clutch 14. Piston 80 is connected in a rigid or non-rotatable manner to second disk carrier 76, which can, e.g., be effected by a weld. First disks 74 and second disks 78 alternate when viewed in longitudinal direction of rotation axis 36. When loading disk packet 79, formed by first disks 74 and second disks 78 by means of piston 80, disk packet 79 is supported on the side of disk packet 79, which is opposed to piston 80, at a section of the inside of converter housing 16. Between adjacent disks 74 and 78, and on both the ends of disk packet 79, friction liners 81 are provided, which are supported, e.g., at disks 74 and/or 78. Friction liners 81, which are provided at the ends of disk packet 79, can also be supported at one side and/or at the other side at the inside of converter housing 16 or at piston 80.

In the embodiments shown in FIGS. 1, 2, and 4, piston 80 is configured integrally with second component 60, thus the input component of first energy accumulator means 38. In the embodiment shown in FIG. 3, piston 80 is non-rotatably connected or connected in a rigid manner, to second component 60 or the input component of first energy accumulator means 38, wherein the rigid connection is performed here, e.g., by a weld joint in this location. As a matter of principle, a non-rotatable connection can also be performed in another manner. In the embodiments shown in FIGS. 1, 2, and 4, piston 80 and input component 60 can also be configured in an alternative embodiment of the first accumulator means as separate components, which are connected amongst each other, e.g., by a weld joint, or by a rivet or a bolt in a rigid or non-rotatable manner. In the embodiment shown in FIG. 3, in order to create the rigid or non-rotatable connection, instead of the weld joint, another suitable connection between piston 80 and input component 60 can be provided, like, e.g., a bolt or a rivet connection, or a plug-in connection, or, alternatively, piston 80 with input component 60 can also be produced integrally in one piece.

Piston 80 or second component 60, first component 46, or intermediary component 46, third component 62 and driver component 50 are formed by plates, respectively. Additionally, in the embodiment shown in FIG. 4, support component 70 can be formed by a plate. Second component 60 is a flange, in particular. First component 46 is a flange, in particular. Third component 62 is a flange, in particular.

In the embodiments shown in FIGS. 1-3, the mass moment of inertia of driver component 50 is greater than the mass moment of inertia of piston 80 or of input component 60 of first energy accumulator means 38, or of the unit comprised of components 60 and 80. In the embodiment shown in FIG. 2, the plate thickness of driver component 50 is greater than the plate thickness of piston 80 or of input component 60 of first energy accumulator means 38.

It is appreciated that the vibration properties in the embodiment shown in FIG. 4 are worse than in the embodiments shown in FIGS. 1-3. In the embodiment shown in FIG. 2, the vibration properties of device 1 are particularly good.

For first energy accumulators 42, a type of housing 82 is respectively formed, which extends at least partially on both sides axially and radially on the outside about the respective first energy accumulator 42 with reference to the radial direction and the axial direction of rotation axis 36. In the embodiments shown in FIGS. 1-3, housing 82 is disposed at driver component 50, while it is disposed at piston 80 in the embodiment according shown in FIG. 4. In most applications, the non-rotatable disposition at driver component 50 or at outer turbine dish 26 is advantageous from a vibration point of view, since hereby more mass moment of inertia is moved to the secondary side of first energy accumulator means 38.

In the embodiment shown in FIG. 3, first energy accumulators 42 can be supported by a respective means 84, which can also be called a roller shoe, comprising roller bodies like balls or rollers, at housing 82, in order to reduce friction. Though this is not shown in FIGS. 1, 2 and 4, such means 84, comprising roller bodies like balls or rollers for supporting first energy accumulator 42 and for reducing friction, can also be provided accordingly in the embodiments shown in FIGS. 1, 2, and 4. According to FIGS. 1, 2 and 4, however, a slider shell or a slider shoe is provided instead of such roller shoe 84 for low friction support of first energy accumulators 42.

Furthermore, second rotation angle limiter means 92 for second energy accumulator means 40 is provided in the embodiments shown in FIGS. 1-3, and may be provided in the embodiment shown in FIG. 4, by means of which the maximum rotation angle or the relative rotation angle of second energy accumulator means 40, or of the input component of second energy accumulator means 40 is limited relative to the output component of second energy accumulator means 40. This is performed here so that the maximum rotation angle of second accumulator means 40 is limited by second rotation angle limiter means 92, so that it is prevented that second energy accumulators 44, which are springs, in particular, go into blockage under a respectively high torque loading. Second rotation angle limiter device 92 is configured, e.g., as shown in FIGS. 1-3, so that driver component 50 and intermediary component 46 are non-rotatably connected by a bolt, which is, in particular, a component of connection means 56, wherein the bolt extends through a slotted hole, which is provided in the output component of second energy accumulator means, or in third component 62. A first rotation angle limiter means for first energy accumulator means 38 can also be provided, which is not shown in the figures, by means of which the maximum rotation angle of first energy accumulator means 38 is limited, so that a blockage loading of first energy accumulators 42, which are, in particular, respectively provided as springs, is avoided. In a preferred embodiment, second energy accumulators 44 are straight (compression) springs and first energy accumulators 42 are arc springs, and it can be provided that only a second rotation angle limiter means is provided for second energy accumulator means 40, as illustrated in FIGS. 1-3, since in such embodiments, and in case of going into blockage, the risk of damages is smaller with arc springs, than with straight springs, and an additional first rotation angle limiter means would increase the number of components or the manufacturing cost.

In a particularly advantageous embodiment, it is provided in the embodiments shown in FIGS. 1-4 that the rotation angle of first energy accumulator means 38 is limited to a maximum first rotation angle, and the rotation angle of second energy accumulator means 40 is limited to a maximum second rotation angle, wherein first energy accumulator means 38 reaches its maximum first rotation angle when a first threshold torque is applied to first energy accumulator means 38, and wherein second energy accumulator means 40 reaches its maximum second rotation angle when a second threshold torque is applied to second energy accumulator means 40, wherein the first threshold torque is smaller than the second threshold torque. This can be accomplished, in particular, by a respective setting of energy accumulator means 38 and 40 or of energy accumulators 42 and 44 of energy accumulator means 38 and 40, possibly, or by the first and/or the second rotation angle limiter means.

It can be provided, that first energy accumulators 42 go into blockage at the first threshold torque, so that first energy accumulator means 38 reaches its maximum first rotation angle, and it is accomplished by means of the second rotation angle limiter means for second energy accumulator means 40 that second energy accumulator means 40 reaches its maximum second rotation angle at a second threshold moment, wherein the maximum second rotation angle is reached, when the second rotation angle limiter means reaches a stop position. This way, in particular, a good setting for partial load operation can be accomplished.

It is appreciated that the rotation angle of first energy accumulator means 38, or of second energy accumulator means 40, and the same applies for the maximum first or maximum second rotation angle, are the relative rotation angles with reference to the circumferential direction of rotation axis 36 of torsion vibration damper 10, which is present relative to the unloaded resting position between torque transfer components directly adjacent to the respective energy accumulator means 38 or 40 on the input side and output side. The rotation angle, which is limited in the manner by the respective maximum first or second rotation angle, can change by energy accumulators 42 or 44 of the respective energy accumulator means 38 or 40 absorbing energy, or releasing stored energy.

In the embodiments shown in FIGS. 1-3, piston 80, the second component, or input component 60 of first energy accumulator means 38, forms several ears 86 distributed over the circumference, each comprising non-free end 88 and free end 90, which are provided for face side, input side loading of a respective first energy accumulator 42. Non-free end 88 is thus disposed radially within free end 90 of the respective ear 86 with reference to the radial direction of rotation axis 36.

In the embodiments shown in FIGS. 1-4, the radial extension of driver component 50 is greater than the center radial distance of first energy accumulator(s) 42 from second energy accumulator(s) 44 with reference to the radial direction of axis 36 of torsion vibration damper 10.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

DESIGNATIONS

1 hydrodynamic torque converter device
2 motor vehicle drive train
10 torsion vibration damper
12 converter torus
14 converter lockup clutch
16 converter housing
18 drive shaft, like e.g. engine output shaft of a combustion engine
20 pump or pump shell
22 stator shell
24 turbine or turbine shell
26 outer turbine shell
28 torus interior
30 wall section of 26
32 extension at 30 of 26
34 straight section of 32, or annular disk shaped section of 32
36 rotation axis of 10
38 first energy accumulator means
40 second energy accumulator means
42 first energy accumulator
44 second energy accumulator
46 first component of 10
48 load transfer path
50 driver component
52 connection means or weld connection between 32 and 50 in 48
54 connection means or bolt or rivet joint between 32 and 50 in 48
56 connection means or bolt or rivet joint between 50 and 46 in 48
58 connection means or plug-in connection between 50 and 46 in 48
60 second component
62 third component
64 hub
66 output shaft, transmission input shaft
68 support section
70 support component
72 first disk carrier of 14
74 first disk of 14
76 second disk carrier of 14
78 second disk of 14
79 disk packet of 14
80 actuation piston of 14
81 friction liner of 14
82 housing
84 roller shoe
86 ear
88 non-free end of 82
90 free end of 82
92 second rotation angle limiter means 92 of 40
94 slider shoe

What is claimed is:

1. A hydrodynamic torque converter device for a motor vehicle drive train, the hydrodynamic torque converter device comprising:
   a torsion vibration damper comprising:
      a first plurality of energy accumulators; and,
      a second plurality of energy accumulators, the second plurality of energy accumulators being located radially inward of the first plurality of energy accumulators and being serially connected with the first plurality of energy accumulators;
   a converter torus comprising:
      a torus interior;
      a pump shell;
      a turbine shell having an outer turbine dish and a wall section formed thereby, the wall section directly abutting and at least partially defining the torus interior; and,
      a stator shell;

a plurality of adjoining components connected to each other and arranged for transferring torque therethrough, the plurality of adjoining components including:
a first component arranged between, and serially connected to, the first plurality of energy accumulators and the second plurality of energy accumulators, and connected to the outer turbine dish such that a torque is transferable from the outer turbine dish to the first component; and,
a driver component;
a load transfer path extending from the outer turbine dish to the first component, and through which torque is transferable from the outer turbine dish to the first component;
a second component;
at least a first connection means arranged to connect the driver component to the first component the plurality of adjoining components along the load transfer path, the at least first connection means being offset from the wall section; and,
a second connection means connecting the driver component and the outer turbine dish, wherein the outer turbine dish is connected to the first component by means of the driver component, wherein the driver component forms a radial extension, which extends radially outwardly, with respect to the radial direction of the rotation axis and which is disposed radially outside of the second connection means and the second plurality of energy accumulators, wherein at least one first energy accumulator is supported at the radial extension of the driver component and arranged such that torque is transferable from the second component through the first plurality of energy accumulators to the driver component, and wherein the driver component is arranged to transfer torque to the first component.

2. The hydrodynamic torque converter device recited in claim 1, further comprising a third component, wherein the first plurality of energy accumulators is disposed between the second component and the first component, and wherein the second plurality of energy accumulators is disposed between the first component and the third component, so that a torque can be transferred from the second component through the first plurality of energy accumulators to the first component, and from the first component through the second plurality of energy accumulators to the third component.

3. The hydrodynamic torque converter device recited in claim 2, wherein the third component forms, or is non-rotatably connected to, a hub, and the outer turbine dish is rotatable relative to the hub, and is radially supported at the hub by means of a sleeve-shaped support section.

4. The hydrodynamic torque converter device recited in claim 2, wherein the torsion vibration damper is rotatable about a rotation axis, and wherein the first plurality of energy accumulators is disposed radially outside of the second plurality of energy accumulators, with respect to the rotation axis.

5. The hydrodynamic torque converter device recited in claim 4, wherein the at least second connection means is radially disposed, with respect to the rotation axis, within at least one second energy accumulator.

6. The hydrodynamic torque converter device recited in claim 1, wherein the driver component comprises a single component.

7. The hydrodynamic torque converter device recited in claim 2, wherein the torque converter device comprises a converter lockup clutch.

8. The hydrodynamic torque converter device recited in claim 7 further comprising a converter housing, wherein the converter lockup clutch includes an open and a closed position and is disposed between the converter housing and the second component, wherein the hydrodynamic torque converter device is arranged such that torque is transferable from the converter housing to the second component and from the second component, through the first plurality of energy accumulators, to the first component, when the converter lockup clutch is in the closed position, and wherein the hydrodynamic torque converter device is arranged such that torque is nontransferable from the converter housing, through the second component and the first plurality of energy accumulators, to the first component, when the converter lockup clutch is in the open position.

9. The hydrodynamic torque converter device recited in claim 2, wherein the second component comprises a plate having a thickness, the driver component comprises a plate having a thickness, and wherein the plate thickness of the driver component is greater than the plate thickness of the second component.

10. The hydrodynamic torque converter device recited in claim 2, wherein the driver component comprises a mass moment of inertia, the second component comprises a mass moment of inertia, and the mass moment of inertia of the driver component is greater than the mass moment of inertia of the second component.

* * * * *